United States Patent [19]
Coombs et al.

[11] Patent Number: 5,674,337
[45] Date of Patent: Oct. 7, 1997

[54] DECORATIVE ADHESIVE COVING PROCESS FOR MATCHING SYNTHETIC SURFACES

[75] Inventors: Donald W. Coombs; Donald E. Coombs, both of Tucson, Ariz.

[73] Assignee: Align-Rite Tool Company, Tucson, Ariz.

[21] Appl. No.: 555,154

[22] Filed: Nov. 8, 1995

[51] Int. Cl.⁶ .............................. E04B 2/00; E04F 13/00
[52] U.S. Cl. ............... 156/71; 156/304.1; 156/304.6; 156/305; 52/741.4; 312/140.1; 312/140.4
[58] Field of Search ....................... 156/71, 304.1, 156/304.6, 305; 52/35, 741.4; 312/140.1, 140.3, 140.4

[56] References Cited

U.S. PATENT DOCUMENTS

| | | | |
|---|---|---|---|
| 2,586,112 | 2/1952 | Stoddard | 312/140.3 X |
| 3,606,508 | 9/1971 | Burnes | 312/140.3 |
| 3,754,363 | 8/1973 | Schneller et al. | 156/71 X |
| 3,814,655 | 6/1974 | Weill et al. | 156/305 X |
| 4,608,291 | 8/1986 | Gove | 428/119 |
| 4,971,649 | 11/1990 | Aydin et al. | 156/71 X |
| 5,058,342 | 10/1991 | Crompton | 156/71 X |
| 5,238,721 | 8/1993 | Nakazawa | 156/71 X |
| 5,330,262 | 7/1994 | Peters | 312/140.4 |

FOREIGN PATENT DOCUMENTS

| | | | |
|---|---|---|---|
| 5331442 | 3/1994 | Japan. | |
| 2189253 | 10/1987 | United Kingdom | 156/304.1 |

*Primary Examiner*—David A. Simmons
*Assistant Examiner*—Paul M. Rivard
*Attorney, Agent, or Firm*—Benman, Collins & Sawyer

[57] ABSTRACT

A smooth, seamless arcuate-shaped inside corner is formed between a counter top and a splash board, both made from a filled polymer material. The counter top has a top surface, while the splash board has an end edge orthogonal to a front surface. The two articles are joined to form a butt joint therebetween, and a bead of a filled epoxy material is formed along the inside corner of the butt joint. A smoothing tool, which has a smoothing surface of the desired curvature, is used to smooth the bead. When cured, the bead matches the color and texture of the two articles and provides a smooth, seamless, arcuate-shaped inside corner. The filled epoxy comprises an epoxy resin and a hardener in a ratio of about 2:1 resin:hardener, together with a filler and/or a colorant. The filler comprises a mixture of alumina trihydrate and particulates in a ratio within the range of about 75:25 to 25:75 alumina trihydrate:particulates. In addition to joining counter tops and splash boards, the apparatus and method may be advantageously employed to join panels of shower stall walls, ceiling, and floor pan, whether edge-to-edge or edge-to-surface, to form an integral monolithic stall.

30 Claims, 1 Drawing Sheet

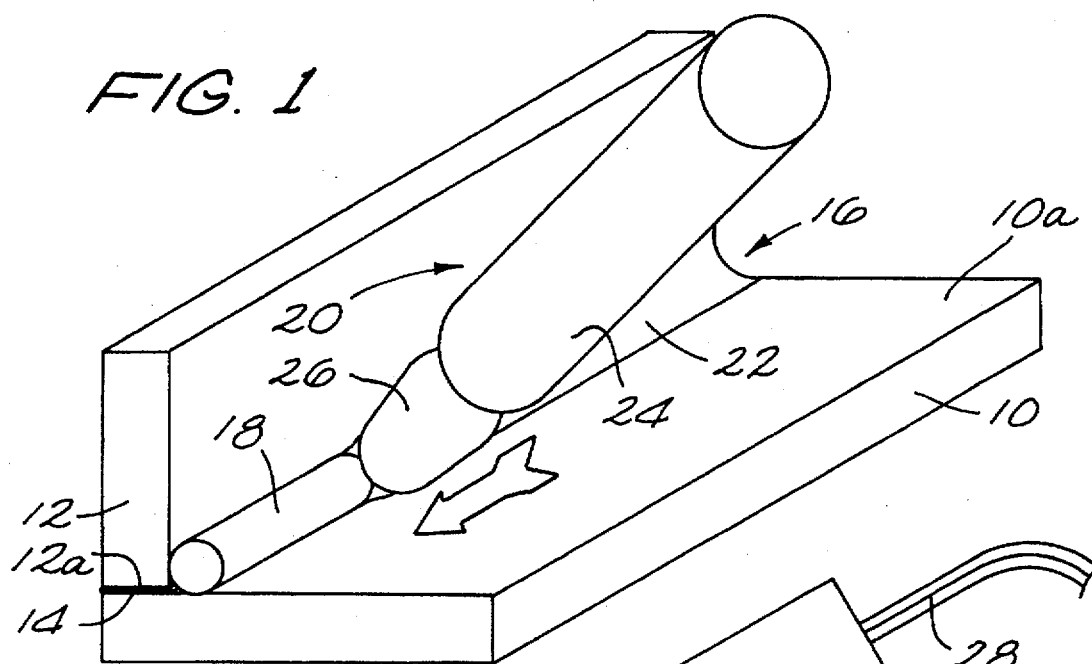
FIG. 1
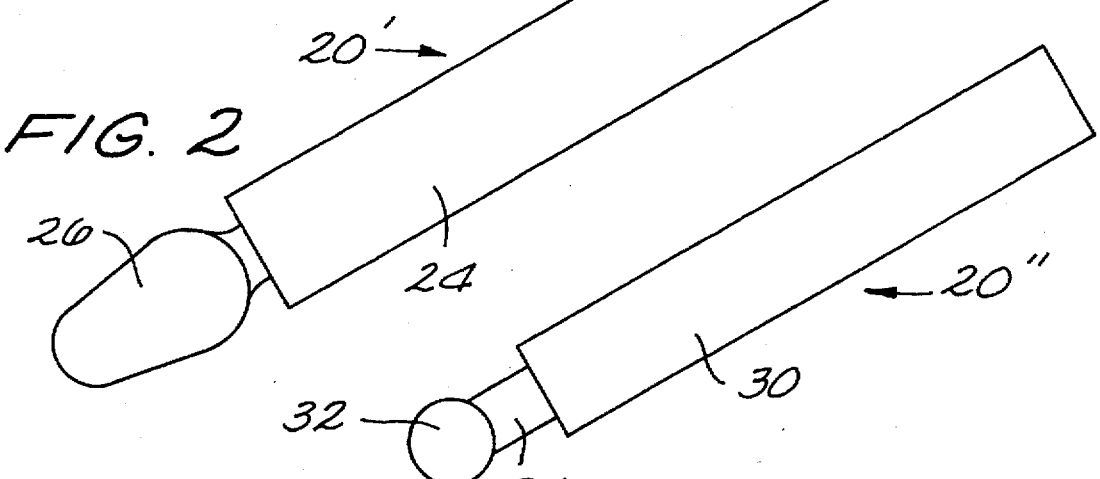
FIG. 2
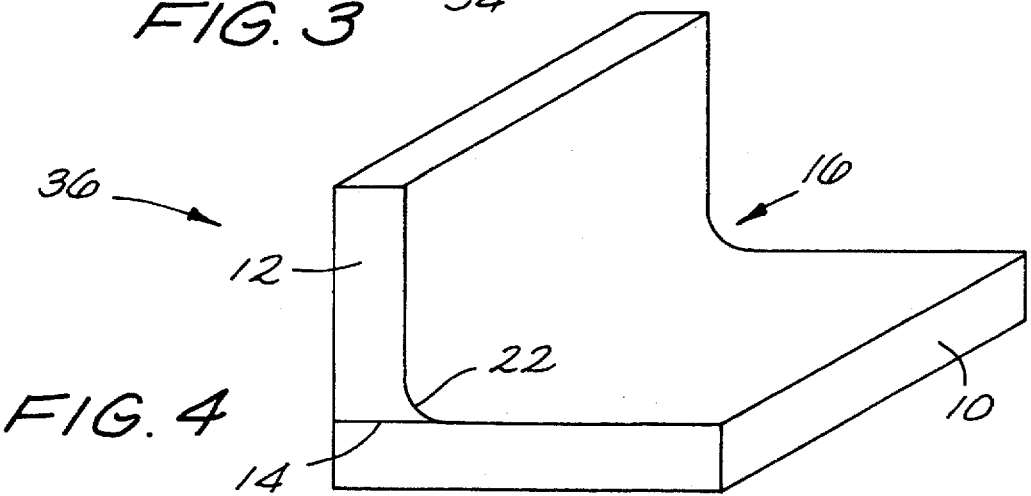
FIG. 3
FIG. 4

DECORATIVE ADHESIVE COVING PROCESS FOR MATCHING SYNTHETIC SURFACES

TECHNICAL FIELD

The present invention relates to apparatus and method for joining panels, comprising methyl methacrylate filled with a material, such as alumina trihydrate, to form butt joints, which are useful, for example, in forming coves for kitchen and bathroom counter tops and for joining shower stall walls and bathtub enclosures, employing a filled epoxy ("decorative adhesive") along the joint. In all cases, a seamless, monolithic structure is obtained, comprising two panels joined together by the cured filled epoxy.

BACKGROUND ART

Filled plastics are used for many products and various methods for manufacturing such materials into variously shaped articles is well-known. One such filled plastic material is simulated marble, which is based primarily on filled polymethyl methacrylate. Various fillers may be employed to provide a variety of advantageous properties to the article, such as translucency, resistance to staining, flame resistance, machineability, resistance to stress cracking, etc.

Simulated marble products of the type indicated may be attractively processed and have become popular for use as industrial and home counter tops. Usually such counter tops have a flat horizontal slab, or panel, and a smaller vertical backsplash slab, or panel, which is glued to the horizontal slab to form a square inside corner. Edge pieces are sometimes glued to each of the slabs to improve counter top appearance.

It is recognized by the industry that an integral counter top with a rounded transition between the horizontal and vertical surfaces is particularly attractive and is advantageous for cleaning and, consequently, is often preferred by the consumer. Smaller sink counter top simulated marble products have been molded to form inside corners. The molding process, however, is not economical for larger products, and consequently, counter top products made from simulated marble and having a rounded inside corner are not available for most applications. A method for bending filled polymethyl methacrylate has been developed and is referred to in U.S. Pat. No. 4,608,291 as application Ser. No. 476,506, filed Mar. 18, 1983. The bending process, however, is not available for applications having a molded sink as an integral part of the counter top. This process is expensive and requires use of a high precision oven and highly skilled operators.

Also, a molded third member as the corner of horizontal and vertical counter top slabs has been developed. The molded third member has flat surfaces to abut the end edges of the horizontal and vertical slabs. The molded third member also has a concave arcuate transition between the flat sides so that when the third member is glued to the horizontal and vertical slabs, the assembly appears to have a rounded transition at the inside corner. However, routing off excess is difficult to do without leaving grooves in either horizontal or vertical surfaces. These marks are hard to sand out and also have to be done by skilled tradespersons. Further, the assembly process is time-consuming and it is not uncommon that cracks between the various pieces are quite visible. Additionally, a glue bead at the cracks between the various pieces must be removed by sanding or other process.

U.S. Pat. No. 4,608,291 discloses and claims a method of shaping an inside corner of a counter top made from a filled polymer material, using first and second slabs. The first slab has a top surface and the second slab has an end edge orthogonal to a front surface. A connecting slab having parallel upper and lower sides has an arcuate surface between the upper and lower sides. The connecting slab is fastened between the first and second slabs, thereby providing the counter top with orthogonal front and top surfaces with an arcuate surface of the connecting slab mating with the top and front surfaces to form a rounded inside corner. However, this approach has several drawbacks, including (1) the requirement of a third piece (connecting slab) and (2) the need to shape the connecting slab, such as with a router or other shaping tool. During routing, the two slabs must be maintained at an angle of 90°, thus requiring clamps to hold the slabs in position. Further, the routing operation is time-consuming; approximately 13 hours are required to rout and sand a length of 20 feet, depending on the corner configuration, such as 45° or 90°. In addition, further machining and sanding are necessary in order to achieve the finished product. Finally, the entire operation must be done by professional tradespersons.

Thus, there remains a need for providing a seamless, curved surface between a counter top and splash board orthogonal thereto, where the counter top and splash board comprise filled methyl methacrylate, particularly where the filler is alumina trihydrate. Such a product is known as CORIAN® (registered trademark of E.I. du Pont de Nemours, Wilmington, Del.). Correspondingly, a need remains for joining panels of shower stall walls and floor pan, in either edge-to-edge configuration or in edge-to-surface configuration, to form a water-tight enclosure. Further, the joining operation should be capable of being done by a person with only minimal mechanical ability, without requiring expensive and dangerous tools, such as routers.

DISCLOSURE OF INVENTION

In accordance with the present invention, apparatus and a method are provided for forming (1) a smooth, seamless, rigid, arcuate-shaped inside corner of a counter top or (2) a smooth, seamless, flexible (or semi-rigid), butt joint or arcuate-shaped inside corner of a shower stall or bathtub enclosure, made from a filled polymer material. The apparatus and method are also suitable for joining edge-to-edge butt joints of slabs, or panels. The present invention is directed also to the product resulting from use of the apparatus and method.

The counter top of the present invention includes first and second flat slabs. The first slab has a top surface, while the second slab has an end edge orthogonal to a front surface. The two slabs are joined to form a butt joint therebetween, and a bead of a filled epoxy material is formed along the inside corner of the butt joint. A smoothing tool, which has a smoothing surface of the desired curvature, is used to smooth the bead. When cured, the bead matches the texture of the two slabs and provides a smooth, seamless, arcuate-shaped inside corner. Alternatively, two slabs may be joined edge to edge to form a butt joint therebetween. Again, a smoothing tool is used to smooth the bead and, when cured, form a smooth, seamless, and continuous surface from one slab to the other.

In particular, the method of the present invention joins two panels together, both of the panels comprising a filled polymeric material with at least one filler. The method comprises:

(a) aligning the two panels together in butting relationship to form a joint;

(b) applying a bead of a filled epoxy to the joint;

(c) smoothing the bead; and (d) curing the smoothed epoxy bead, thereby forming a seamless, integral, monolithic unit comprising the two panels and the cured epoxy. The cured epoxy forms a joining surface between the two panels that is virtually indistinguishable in color and texture from the two panels.

The filled epoxy comprises an epoxy resin and a hardener in a ratio of about 2:1 resin:hardener, together with at least one of a filler and a colorant. The filler comprises a mixture of alumina trihydrate and particulates in a ratio within the range of about 75:25 to 25:75 alumina trihydrate:particulates. The colorant is a tinting agent used to match the filled epoxy to the color of the panels, if the panels themselves contain such a colorant.

Also in accordance with the present invention, a kit for use in joining two panels together is provided. The kit comprises pre-mix containers, with premeasured epoxy resin in one container, pre-measured hardener in another container, and at least one pre-measured member selected from the group consisting of a second filler and a colorant in yet another container. The kit may be used by a person with only minimal mechanical skill in the practice of the present invention.

The present invention is particularly advantageous, since a method and apparatus for use in the method is identified which results in a counter top with a rounded inside corner. Such method may be used for counter tops which cannot be bent, such as those which include a bowl formed in the counter top. Furthermore, the final product of the present invention does not depend on the skill of craftsmen matching surfaces and masking cracks as in the prior art, but is a result of a repeatable process which yields a smooth, uniform, rounded corner which does not have stress lines which could later result in cracks. In addition, the apparatus and method of the invention may be advantageously employed to join panels of shower stall walls, ceiling, and floor pan to form an integral monolithic stall.

The present method and apparatus not only results in a beautiful, reliable product, but the method and apparatus used to make that product is simple and inexpensive. The method may be performed by average people with minimal mechanical ability to install CORIAN® panels in their own homes without expensive and dangerous routers.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

FIG. 1 is a perspective view, illustrating smoothing of an epoxy bead along the joint between a counter top and a splash board;

FIG. 2 is a side elevational view of one embodiment of a tool suitable for smoothing the epoxy bead shown in FIG. 1;

FIG. 3 is a side elevational view of another embodiment of a tool suitable for smoothing the epoxy bead shown in FIG. 1; and FIG. 4 is a perspective view, illustrating the completed cove joint between the counter top and the splash board.

The drawings referred to in this description should be understood as not being drawn to scale except if specifically noted.

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

Referring now to FIG. 1, a first panel or slab 10 having a top surface 10a is shown, on which a second panel or slab 12 is joined along an end edge 12a orthogonal to the top surface to form a butt joint 14 therebetween. The joining of the two slabs 10, 12 forms an inside corner 16.

The two slabs 10, 12 comprise a mixture of a filler and polymers containing methyl methacrylate as the major monomer component. The preferred filler is alumina trihydrate, although mixtures of other fillers with alumina trihydrate can be used. Examples of such other fillers include silica, alumina, calcium carbonate, titania, ground mica, and the like. The filler must be inert, i.e., a material substantially unaffected by the other ingredients present in the preparation of the resultant article. The polymer can be methyl methacrylate homopolymer or a copolymer of methyl methacrylate with at least one other alpha, beta-ethylenically unsaturated compound (e.g., vinyl acetate, styrene, alkyl acrylates, acrylonitrile, alkyl methacrylates, or multifunctional acrylic monomers, such as alkylene dimethacrylates and alkylene diacrylates, etc.). The ingredients and method of preparing a methyl methacrylate polymer material using alumina trihydrate filler are described in U.S. Pat. No. 3,847,865. A commercial embodiment of filled polymer materials which are particularly applicable to the present invention is CORIAN® (registered trademark of E.I. du Pont de Nemours, Wilmington, Del.).

A bead 18 of a filled epoxy is next laid in along the inside corner 16, using any convenient dispensing means, such as a conventional hand-operated caulking gun or a pneumatic heated caulking gun. Once the bead 18 is formed in the inside corner 16, a smoothing tool 20 is used to smooth the bead and form a cove 22 of the desired radius.

The filled epoxy comprises a conventional resin, such as the diglycidyl ether of Bisphenol A, and hardener, such as an aliphatic amine or nonylphenol, in the usual ratio of about 2:1 resin:hardener. The filler, if employed, comprises a mixture of alumina trihydrate (ATH) and particulates in a ratio within the range of about 75:25 to 25:75 ATH:particulates. The particulates comprise particles of ATH-filled methyl methacrylate (preferably) with, optionally, other filler, such as silica or the other fillers mentioned above. As is well-known, the particulates are sieved to a series of screen sizes, ranging from numbers 4 to 60, so as to provide a variety of particulate sizes.

The colorant, if employed, comprises any of the conventional epoxy tinting agents, color-matched to the panels 10, 12 being joined together.

Using particulates of ATH-filled methyl methacrylate and/or colorants permits matching texture and color, so that upon curing, the cove 22 is virtually indistinguishable from the two slabs 10, 12. Further, the epoxy cove 22 provides structural support for the two slabs 10, 12.

The amount of filler is substantially the same (on a weight basis) as the resin, ±10% A conventional thixotropic agent may be used in the usual concentration to provide an epoxy that can be ejected from a caulking tube and will retain its bead shape prior to the shaping operation described below. The thixotropic agent may comprise any of the well-known materials for this purpose, such as fine particle fillers like clays, talc, and fumed silica. The amount of thixotropic agent is that amount which is effective in producing the desired thixotropic properties of the final product, i.e., that amount which prevents the bead 18 from flowing under its own weight. Simple experimentation will readily determine the appropriate amount of thixotropic agent in the adhesive composition. The scope of experimentation required to determine the proper concentration of thixotropic agent is considered to be reasonable for those having ordinary skill in the art and is not considered to be undue.

Also, an air release agent is preferably employed in the usual concentration to provide cast epoxy products without air holes. When the bead 18 is smoothed with the heated round forming tool 20 to form the cove 22, the air release agent is activated and bubbles begin to rise to the surface of the cove. The top surface of the cove 22 is the finished product and it is important that this surface be free from air holes. Approximately 90% of the air will rise to the surface from heat alone. While this may be adequate for most applications, the remaining 10% of bubbles may be removed from the surface by flooding the surface with carbon dioxide. A preferred air release agent employed in the filled epoxy employed in the practice of the present invention is a polysiloxane.

Finally, an ultra-violet stabilizer may be added, employing a conventional UV stabilizer that is compatible with the ingredients of the filled epoxy used herein.

The foregoing basic filled epoxy is used for counter tops and vanities. Shower stalls and bathtub enclosures, on the other hand, tend to expand and contract slightly due to use of hot water. In joining panels used in such shower stalls and bathtub enclosures, the foregoing filled epoxy is modified slightly by including therein any of the well-known flexibilizer compounds, in a conventional concentration. Polyols having molecular weights of at least 1,000 and triols with molecular weights ranging from 1,500 to 6,000 are commonly employed as non-reactive plasticizers. Examples of high molecular weight triols include high molecular weight poly(oxypropylene) triol and hydroxyl-terminated polybutadiene Other examples of suitable non-reactive flexibilizers include phthalate esters, adipate esters, and methyl lineolate.

The purity of all components in the filled epoxy is that normally employed in commercial practice.

Examples of smoothing tools 20 suitably employed in the practice of the present invention are depicted in FIGS. 2 and 3. FIG. 2 illustrates a lighted tool 20', comprising a handle 24 and a light bulb 26. The light bulb 26 is secured in one end of the handle 24 and is electrically connected to electric cord 28 inside the handle. A small light bulb 26 of the desired cove radius is employed. The wattage is on the order of 7 to 15 watts, and provides a source of light during the smoothing operation. Further, the mild heat from the bulb 26 helps the epoxy to flow, thereby providing a smooth, seamless coving 22 between the two panels 10, 12. As will be appreciated by those skilled in this art, different size bulbs 26 will result in different coving radii, allowing the user to tailor the cove 22 to a desired shape.

Another example of a smoothing tool 20" is illustrated in FIG. 3, which shows a handle 30 to which a ball 32 on the end of a rod 34 is secured The rod 34 may be threaded, with the ball 32 provided with a threaded recess (not shown) to permit interchanging of balls of different radii, again to permit tailoring the cove 22 to a desired shape. The ball 32 may be provided with a heating means (not shown), such as a thermostatically-controlled heating means, to help smooth the epoxy bead 18 during the smoothing operation. Or, the handle 30 could be attached to the end of a small hair dryer to accomplish the same heating effect.

Examples of yet other smoothing tools include a soldering gun provided with a ball of the desired radius, optionally provided with a lighting means to permit viewing the smoothing operation.

As will be appreciated from the foregoing examples, different cove radii may be selected, ranging from 3/8 inch (the radius of the commercial embodiment described and claimed in the above-referenced U.S. Pat. No. 4,608,291) or more to much smaller and more aesthetically-pleasing radii, for example, 3/16 inch.

The finished product is seen in FIG. 4. The inside corner 16 is inlaid with the smooth epoxy to form the cove 22. Since the filled epoxy has the same texture and color as the two slabs 10, 12, then, upon curing, the final product appears to be an integral, monolithic member 36, with no joints visible between the two slabs.

The foregoing description has been given in terms of a splash board 12 affixed to the top of a counter top 10. However, the process of the invention is also suitably employed for adhering vertically-mounted panels which are butted either edge-to-edge or at angles of 90° to form enclosures, such as shower stalls and bathtub enclosures. Further, shower pans, which form joints between the vertical walls and the floor, may also be provided with coving as described above. These coving joints are water-tight, as well as being aesthetically pleasing. In the case of smoothing the bead of epoxy along an edge-to-edge joint, a simple blade, such as a putty knife, may be used. Optionally, the smoothing blade may be heated and/or provided with illumination, as described above.

One method of using the filled epoxy is to provide a kit containing pre-mix containers, with pre-measured particulates and ATH in one container, premeasured resin in another container, and pre-measured hardener in yet another container. The thixotropic agent, pre-measured, is ordinarily included in either the resin or the hardener, although it is preferably included in the resin. The air release agent is included in the resin, as is the flexibilizer, if used. At the job site, the components are combined together and loaded into a caulking gun for dispensing to form the bead 18.

The epoxies disclosed herein have a working time of about 1 hour, depending on ambient temperature, and a cure time of about 24 hours at room temperature. Heat lamps can be used to increase the cure rate. For example, curing can take place in about 4 hours at a temperature provided by heat lamps of 135° F.

It will be appreciated that the light bulb wand, shown in FIG. 2, generates a temperature of about 125° F. It is not intended that the light bulb or other heated smoothing tool 20 be used for curing the epoxy. Rather, the heated smoothing tool 20 is intended primarily for smoothing the epoxy bead 18, which is made easier at elevated temperatures. In this connection, the temperature generated by the smoothing tool 20 is desirably within the range of about 100° to 150° F.

The use of a filled epoxy bead 18 to form a cove 22 of the desired radius may be used with other filled polymers. The filler for the epoxy is intended to match that of the filled polymer comprising the slabs 10, 12, using the same fillers as in the filled polymer and including as particulates the filled polymer.

INDUSTRIAL APPLICABILITY

The method and apparatus are expected to be used to join panels for forming counter tops, vanities, shower stalls, bathtub enclosures, and the like.

Thus, there has been disclosed a method and apparatus for joining two panels together, wherein both panels comprise a filled polymeric material, with a filled epoxy. It will be readily apparent to those skilled in this art that various changes and modifications of an obvious nature may be made, and all such changes and modifications are considered to fall within the scope of the present invention, as defined by the appended claims.

What is claimed is:

1. A method for joining two panels together, both said panels comprising a filled polymeric material with at least one first filler, said method comprising:
   (a) aligning said two panels together in butting relationship to form a joint;
   (b) applying a bead of a filled epoxy to said joint;
   (c) smoothing said bead; and
   (d) curing said epoxy bead, thereby forming a seamless, integral, monolithic unit comprising said two panels and said cured epoxy, said cured epoxy forming a joining surface between said two panels that is virtually indistinguishable in color and texture from said two panels.

2. The method of claim 1 wherein said polymeric material comprises methyl methacrylate homopolymer or a copolymer of methyl methacrylate with at least one other alpha, beta-ethylenically unsaturated compound.

3. The method of claim 2 wherein said at least one other alpha, beta-ethylenically unsaturated compound is selected from the group consisting of vinyl acetate, styrene, alkyl acrylates, acrylonitrile, alkyl methacrylates, and multifunctional acrylic monomers.

4. The method of claim 2 wherein said first filler is selected from the group consisting of alumina trihydrate, silica, alumina, calcium carbonate, titania, and ground mica.

5. The method of claim 4 wherein said polymeric material comprises poly(methyl methacrylate) and said filler comprises alumina trihydrate.

6. The method of claim 1 wherein said filled epoxy comprises an epoxy resin and a hardener in a ratio of about 2:1 resin:hardener, together with at least one member selected from the group consisting of a second filler and a colorant, said second filler comprising a mixture of alumina trihydrate and particulates in a ratio within the range of about 75:25 to 25:75 alumina trihydrate:particulates.

7. The method of claim 6 wherein said particulates comprise particles of filled poly(methyl methacrylate) comprising poly(methyl methacrylate) filled with alumina trihydrate and, optionally, at least one filler selected from the group consisting of silica, alumina, calcium carbonate, titania, and ground mica, said particulates comprising essentially the same material as said panels.

8. The method of claim 7 wherein said particulates have an average screened particle size within the range of screen number 4 to screen number 60.

9. The method of claim 6 wherein said second filler is present in substantially the same concentration as said resin.

10. The method of claim 6 wherein said filled epoxy further includes at least one component selected from the group consisting of thixotropic agents, air release agents, flexibilizers, and ultra-violet stabilizers.

11. The method of claim 1 wherein said bead of said epoxy is applied to said joint by dispensing from a caulking gun.

12. The method of claim 1 wherein said bead of said epoxy is smoothed using a tool having either (a) a smoothing tip comprising a pre-selected radius or (b) a blade.

13. The method of claim 12 wherein said tool further includes light means to provide illumination during said smoothing.

14. The method of claim 12 wherein said tool further includes heating means to heat said epoxy to a temperature sufficient to cause flow of said epoxy.

15. The method of claim 14 wherein said temperature is within the range of about 100° to 150° F.

16. The method of claim I wherein one of said panels comprises a counter top having a top surface and the other of said panels comprises a splash board having an edge portion, said edge portion of said splash board mounted orthogonal to said top surface of said counter top, thereby forming an inside corner, along which said bead of said epoxy is applied.

17. The method of claim 1 wherein one of said panels comprises a wall member and the other of said panels comprises either a wall member or a floor member or a ceiling member and are either butted one along side the other to form a lateral joint or are joined at an angle of 90° to form a corner, said bead of said epoxy being applied to said lateral joint or to said corner.

18. A method for joining two panels together, both said panels comprising a filled polymeric material with a first filler, said polymeric material comprising polymethyl methacrylate and said first filler comprising alumina trihydrate, said method comprising:
   (a) aligning said two panels together in butting relationship to form a joint;
   (b) applying a bead of a filled epoxy to said joint;
   (c) smoothing said bead; and
   (d) curing said epoxy bead, thereby forming a seamless, integral, monolithic unit comprising said two panels and said cured epoxy, said cured epoxy forming a joining surface between said two panels that is virtually indistinguishable in color and texture from said two panels.

19. The method of claim 18 wherein said filled epoxy comprises an epoxy resin and a hardener in a ratio of about 2:1 resin:hardener, together with at least one member selected from the group consisting of a second filler and a colorant, said second filler comprising a mixture of alumina trihydrate and particulates consisting essentially of the same material as said panels, said mixture being in a ratio within the range of about 75:25 to 25:75 alumina trihydrate particulates.

20. The method of claim 19 wherein said epoxy resin comprises the diglycidyl ether of Bisphenol A.

21. The method of claim 19 wherein said particulates have an average screened particle size within the range of screen number 4 to screen number 60.

22. The method of claim 19 wherein said second filler is present in substantially the same concentration as said resin.

23. The method of claim 19 wherein said filled epoxy further includes at least one component selected from the group consisting of thixotropic agents, air release agents, flexibilizers, and ultra-violet stabilizers.

24. The method of claim 18 wherein said bead of said epoxy is applied to said joint by dispensing from a caulking gun.

25. The method of claim 18 wherein said bead of said epoxy is smoothed using a tool having either (a) a smoothing tip comprising a pre-selected radius or (b) a blade.

26. The method of claim 25 wherein said tool further includes light means to provide illumination during said smoothing.

27. The method of claim 25 wherein said tool further includes heating means to heat said epoxy to a temperature sufficient to cause flow of said epoxy.

28. The method of claim 27 wherein said temperature is within the range of about 100° to 150° F.

29. The method of claim 18 wherein one of said panels comprises a counter top having a top surface and the other of said panels comprises a splash board having an edge portion, said edge portion of said splash board mounted orthogonal to said top surface of said counter top, thereby forming an inside corner, along which said bead of said epoxy is applied.

30. The method of claim 18 wherein one of said panels comprises a wall member and the other of said panels comprises either a wall member or a floor member or a ceiling member and are either butted one along side the other to form a lateral joint or are joined at an angle of 90° to form a corner, said bead of said epoxy being applied to said lateral joint or to said corner.

* * * * *